United States Patent Office 3,592,861
Patented July 13, 1971

3,592,861
PROCESS FOR THE PREPARATION OF
NITROBENZAL FLUORIDES
Erich Klauke, Odenthal-Hahnenberg, and Engelbert
Kuhle, Bergisch Gladbach, Germany, assignors to
Farbenfabriken Bayer Aktiengesellschaft, Leverkusen,
Germany
No Drawing. Filed June 3, 1969, Ser. No. 830,134
Claims priority, application Germany, June 10, 1968,
P 17 68 635.0
Int. Cl. C07c 79/12
U.S. Cl. 260—646     15 Claims

ABSTRACT OF THE DISCLOSURE

Reacting nitrobenzal chlorides, i.e. 2-(optionally chloro)-3 or 4-nitro-benzal chlorides or 1-dichloromethyl-2-(optionally chloro)-3 or 4-nitro-benzenes with anhydrous hydrogen fluoride at a temperature of about 0–150° C. and a pressure of about 1–26 atmospheres absolute, optionally in the presence of an inert organic liquid solvent, to form in high yield and purity the corresponding nitrobenzal fluorides, i.e. 2-(optionally chloro)-3 or 4-nitro-benzal fluorides or 1 - difluoromethyl-2-(optionally chloro)-3 or 4-nitro-benzenes, some of which are known, and which are intermediates for the production of the corresponding N-(difluoromethyl-phenyl)-N',N'-dimethyl ureas which possess pesticidal, especially herbicidal, properties.

---

The present invention relates to and has for its objects the provision for particular new methods of reacting nitrobenzal chlorides, i.e. 2-(optionally chloro)-3 or 4-nitrobenzal chlorides or 1 - dichloromethyl - 2 - (optionally chloro)-3 or 4-nitro-benzenes with anhydrous hydrogen fluoride, to form the corresponding nitrobenzal fluorides, i.e. 2-(optionally chloro)-3 or 4-nitro-benzal fluorides or 1-difluoromethyl-2-(optionally chloro)-3 or 4-nitro-benzenes; some of which are known, and which are intermediates for the production of the corresponding N-(difluoromethyl-phenyl) - N',N' - dimethyl ureas which possess pesticidal, especially herbicidal, properties; e.g. in a simple reaction, using readily available starting materials and resulting in outstanding yields and purity, with other and further objects of the invention becoming apparent from a study of the within specification and accompanyig examples.

It is known that 3-nitrobenzal fluoride (1a) can be obtained when 3-nitrobenzal chloride is reacted with antimony trifluoride. Antimony trifluoride is a very strong fluorinating agent.

It is also known that even unsubstituted benzal chloride can be fluorinated with antimony trifluoride to give benzal fluoride in a yield of 40% (Bl. Academ. Belgique, 1913, 1074).

Antimony trifluoride is therefore particularly well suited for the fluorination of dichloromethyl groups on the benzene ring.

It is also known that when unsubstituted benzal chloride is reacted with hydrogen fluoride, not benzal fluoride but instead only resinification products are obtained (Houben-Weyl, vol. V/3, p. 122, n. 2).

Finally, it is also known that 2-trichloromethylbenzal chloride can be fluorinated with hydrogen fluoride to give 2-trifluoromethyl-benzal fluoride. This reaction is the sole known case in which it is possible to convert a benzal chloride with hydrofluoric acid into the appropriate benzal fluoride. As can be seen from the comparison of this reaction with the above-mentioned reaction of unsubstituted benzal chloride using hydrogen fluoride, the fluorination of a benzal chloride with hydrogen fluoride obviously requires the presence of a substituent in o-position to the dichloromethyl group and such substituent, in the specific case, is even itself fluorinated (Bl. Academ. Belgique, 1913, 1074).

If, by analogy with the last-mentioned previously known reaction, an attempt is made to convert 2-nitrobenzal chloride into 2-nitrobenzal fluoride with hydrogen fluoride, it turns out that no fluorination is in fact effected but that instead only a resinification product is obtained.

It has now been found, in accordance with the present invention, that a versatile and smooth process may be provided for the production in favorably high yields and high purity of nitrobenzal fluoride of the formula:

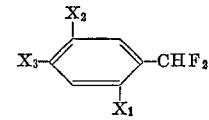

(Ia)

in which $X_1$ is hydrogen or chloro, and
one of $X_2$ and $X_3$ is nitro while the other of $X_2$ and $X_3$ is hydrogen, which comprises reacting nitrobenzal chloride of the formula:

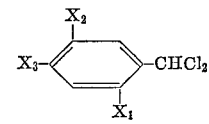

(II)

in which $X_1$, $X_2$ and $X_3$ are the same as defined above, with anhydrous hydrogen fluoride at a temperature of substantially between about 0–150° C., to form the corresponding nitrobenzal fluoride.

It is very surprising that the process of the present invention leads in smooth manner to the desired fluorination products, for it must have been assumed, in view of the prior art, that the reaction of the benzal chlorides used according to the present invention with hydrogen fluoride would lead to resinification products.

The process according to the present invention is superior to the previously known process. Indeed, the process of the present invention exhibits many worthwhile advantages. For example, it can be carried out in a simple and versatile manner. Moreover, the purity (i.e. selectivity) and high yield (i.e. conversion) of the end product makes the process simple to perform from a technological viewpoint. In addition, all of the starting materials are readily accessible technologically and economically.

If 3-nitrobenzal chloride is used as starting material, the course of the instant production reaction can be represented as follows:

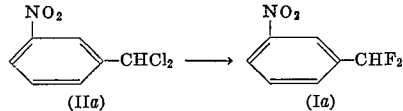

The starting benzal chlorides are clearly characterized by the Formula II above. Such starting compounds are already known from the literature, and may be prepared according to the usual methods, for example by treatment of the appropriate nitro-benzaldehydes with phosphorus pentachloride or by nitration of the appropriate benzal chlorides. In the last-mentioned process, which is particularly economical, mixtures of isomers are always formed. After separation of the ortho-isomer portion, these technical-grade mixtures of meta- and para-isomers can also be fluorinated in the manner of the invention.

The reaction according to the present invention may be carried out optionally in the presence of a solvent (this term includes a mere diluent). All inert organic liquid solvents, and mixtures thereof, are suitable, such as aliphatic chlorinated hydrocarbons especially lower, e.g. $C_{1-6}$, chlorinated aliphatic hydrocarbons, and more especially lower, e.g. $C_{1-6}$, chlorinated alkanes, for example methylene chloride, chloroform, carbon tetrachloride, and the like, and/or aromatic hydrocarbons, especially $C_{6-10}$ aryl hydrocarbons, and lower, e.g. $C_{1-4}$, alkyl substituted-$C_{6-10}$ aryl hydrocarbons for example benzene, toluene, naphthalene, and the like.

The reaction temperatures which may be used can be varied within a fairly wide range. In general, the work is carried out at from substantially between about 0–150° C., preferably from between about 60–120° C.

The reaction can, in principle, be carried out at atmospheric pressure. It is, however, expedient to work at superatmospheric pressure, as may be achieved in a closed vessel. The pressure usable is usually up to about 25 atmospheres gauge. Thus, pressures substantially between about 1–26 atmospheres absolute or 0–25 atmospheres gauge may be used.

When carrying out the instant process, at least 2 mols of hydrogen fluoride are normally used for each mol of starting benzal chloride. It is, however, expedient to use substantially between about 3–8 mols of hydrogen fluoride, which then serves simultaneously as solvent under the appropriate temperature and/or pressure conditions present.

In a preferred method of carrying out the instant process, the reactants are placed in a closed reaction vessel below the boiling point of the hydrogen fluoride, the vessel is heated to the reaction temperature, hydrogen chloride formed being released through a valve and, after completion of the reaction, the reaction mixture is cooled and fractionally distilled whereby the desired nitrobenzal fluoride is separated.

By this means, hydrogen fluoride, nitrobenzal fluoride and unchanged starting material are separated from one another.

The starting materials, of course, can be diluted with a solvent before the reaction, if desired, as the artisan will appreciate.

The benzal fluorides of Formula Ia above obtainable according to the present invention are partially known.

Advantageously, all of the nitrobenzal fluorides produced in accordance with the process of the present invention are useful intermediates which can be converted into herbicidally effective urea derivatives as useful final compounds. In the method for doing so, the corresponding nitrobenzal fluorides are, in a first step, subjected in known manner to a catalytic reduction with hydrogen in the presence of a Raney nickel catalyst, the appropriate aminobenzal fluorides (a) being formed. From these aminobenzal fluorides (a), the appropriate isocyanate benzal fluorides (b) are prepared, in a second step, by phosgenating the amines (a) in known manner, most expediently in chlorobenzene as solvent in a concentration of 10–15 percent by weight of amine. Finally, the isocyanate (b) obtained is, in a third step, reacted with dimethylamine in known manner to give the corresponding N-(difluoromethyl-phenyl)-N′,N′-dimethyl urea (c).

These urea derivatives (c) all exhibit a markedly good herbicidal activity. Such ureas (c) can also be used as selective herbicides, for example for the control of weeds in cotton cultivation.

The present invention therefore provide a new process for producing 3- and 4-nitro-benzel fluoride compounds usable as intermediates for producing herbicidally active urea derivatives, whereby in turn to provide herbicidal compositions containing as active ingredient such a urea derivative produced as described above in admixture with a conventional solid diluent or carrier or in admixture with a conventional liquid diluent or carrier of the usual type. The resulting composition may for example contain from 0.1–95% by weight of the urea derivative active compound and be applied to weeds or their habitat in the well known manner. Thus, there is also provided a method of combating weeds which comprises applying to weeds or a weed habitat a urea derivative made as described above alone or in the form of a composition containing as active ingredient such urea derivative in admixture with a solid or liquid diluent or carrier.

The production process according to the present invention is illustrated, without limitation, by the following examples.

EXAMPLE 1

3-nitrobenzal fluoride (1a)

732 g. (3.6 mols) 3-nitrobenzal chloride and 400 ml. anhydrous hydrogen fluoride are placed in a pressure vessel of stainless steel. At an internal temperature of about 10° C., nitrogen is forced in up to a pressure of 5 atmospheres gauge. The reaction temperature is then brought to 115° C. over three and a half hours, with stirring. The main reaction is carried out at between 70 and 80° C. The internal pressure during this time is kept at 10–11 atmospheres gauge by releasing through a valve the hydrochloric acid which is formed. In the after-reaction which is carried out up to 115° C., the pressure adjusts itself to about 16 atmospheres gauge. Cooling is effected, and first the excess hydrogen fluoride is distilled off. The organic residue is then fractionally distilled. 347 g. 3-nitrobenzal fluoride are obtained as liquid of B.P. 112–114° C./11 mm. Hg. and a refractive index $n_D^{20} = 1.5125$. The further distillation of the residue also yields 255 g. of predominantly unchanged starting material. The yield, with reference to the charge, is 56.5% of the theory (i.e. conversion) and, with reference to the conversion, about 87% of the theory (i.e. selectivity).

EXAMPLE 2

4-nitrobenzal fluoride (2a)

80 g. (0.39 mol) 4-nitrobenzal chloride and 55 ml. anhydrous hydrogen fluoride are added to an apparatus as described in Example 1. A reaction, if only a slight one, can be observed even at room temperature from the evolution of hydrogen chloride. Rapid heating to 120° C. is effected, and this temperature and a pressure of 18.5 atmospheres gauge are maintained for 30 minutes. Cooling and decompression are effected, and the excess hydrogen fluoride is distilled off under a slight vacuum. The residue is distilled. Besides 20 g. of unchanged starting material, there are obtained:

42 g. 4-nitrobenzal fluoride, B.P. 115–117° C./14 mm. Hg, $n_D^{20} = 1.5128$. This corresponds to a yield of 62.5% of the theory (with reference to the charge, i.e. conversion) and 83.5% of the theory (with reference to the conversion, i.e. selectivity).

EXAMPLE 3

2-chloro-5-nitrobenzal fluoride (3a)

140 g. (0.58 mol) 2-chloro-5-nitrobenzal chloride (B.P. 118–123° C./0.15 mm. Hg and 80 ml. hydrogen fluoride are added at −10° C. to an apparatus as described in Example 1. The addition is exothermal, and the internal temperature rises to +15° C. Hydrogen chloride starts to evolve very vigorously. The evolution of hydrogen chloride is allowed to subside in 30 minutes and the autoclave is then closed. After forcing in nitrogen up to a pressure of 3.5 atmospheres gauge, heating to 125° C. is effected, the internal pressure adjusting itself to 18 atmospheres gauge. After cooling and decompression, the mixture is worked up by distillation. Gas-chromatographically pure 2-chloro-5-nitrobenzal fluoride is obtained as a liquid of B.P. 123–124° C./10 mm. Hg. $n_D^{20} = 1.5405$, in a yield of 88% of the theory, with reference to the conversion (i.e. selectivity).

EXAMPLE 4

(a) Preparation of 3-aminobenzal fluoride 186 g. 3-nitrobenzal fluoride are dissolved in 1000 ml. tetrahydrofuran and hydrogenated in the presence of 50 g. Raney nickel at 30° C. with $H_2$ at 60 atmospheres gauge in 160 minutes. After filtration, the amine is isolated by distillation. Yield: 126 g. (82% of the theory), B.P. 100–102° C./11 mm. Hg, $n_D^{20}$ 1.5235.

(b) Preparation of 3-isocyanatobenzal fluoride 520 g. phosgene in 1100 ml. chlorobenzene are placed in a flask. A solution of 272 g. 3-aminobenzal fluoride in 1800 ml. of chlorobenzene is run in at between 0 to 10° C. After completion of the addition, heating is effected slowly to 120° C., and at this temperature for a further 90 minutes a vigorous stream of phosgene is passed through the reaction mixture. Blowing out with carbon dioxide at 120° C. is then effected for 3 hours, followed by working up by distillation. Yield: 289 g. (90% of the theory) 3-isocyanatobenzal fluoride, B.P. 82° C./12 mm. Hg, $n_D^{20}$=1.5035.

(c) Preparation of N-(3-difluoromethyl-phenyl)-N',N'-dimethyl urea

A solution of 10 g. 3-difluoromethyl-phenyl isocyanate in 30 ml. dioxan is added dropwise at room temperature to 100 ml. of a 10% aqueous dimethylamine solution. The temperature is allowed to rise to 30° C. After subsidence of the reaction, the N-(3-difluoromethyl-phenyl)-N'-N'-dimethyl urea (11 g.) is filtered off with suction. M.P.: 136 to 138° C.

The following further example is set forth to illustrate, without limitation, the herbicidal utility for a typical final compound prepared from the nitrobenzal fluoride intermediates produced in accordance with the process of the present invention:

EXAMPLE 5

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seeds of the test plants are sown in normal soil and, after 24 hours, watered with the preparation of the given active compound. It is expedient to keep constant the amoun of water per unit area. The concentration of the active compound in the preparation is of no importance, only the amount of active compound applied per unit area being decisive. After three weeks, the degree of damage to the test plants is determined and characterized by the values 0–5, which have tht following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged The particular active compounds tested, the amounts applied and the results obtained can be seen from the following table:

TABLE.—PRE-EMERGENCE TEST

| Active compound | Active compound applied in kg./hectare | Echinocloa | Chenopodium | Galin-Sinapis | soga | Stellaria | Matricaria | Cotton |
|---|---|---|---|---|---|---|---|---|
| 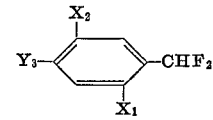 (known) | 10 | 5 | 5 | 5 | 5 | 5 | 5 | 3 |
| | 5 | 5 | 5 | 5 | 5 | 5 | 5 | 2–3 |
| | 2.5 | 5 | 5 | 5 | 5 | 5 | 5 | 2 |
| | 1.25 | 4 | 5 | 4 | 4 | 5 | 4 | 0 |
| 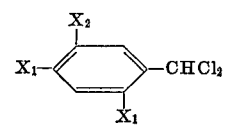 | 10 | 5 | 5 | 5 | 5 | 5 | 5 | 2 |
| | 5 | 5 | 5 | 5 | 5 | 5 | 5 | 1 |
| | 2.5 | 5 | 5 | 5 | 5 | 5 | 5 | 0 |
| | 1.25 | 4 | 5 | 4 | 5 | 5 | 5 | 0 |

It will be appreciated that the instant specification and examples are set forth by way of illustration and not limitation, and that various modifications and changes may be made without departing from the spirit and scope of the present invention.

What is claimed is:

1. Process for the production of nitrobenzal fluoride of the formula

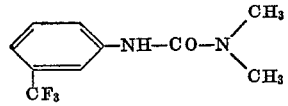

in which $X_1$ is selected from the group consisting of hydrogen and chloro, and one of $X_2$ and $X_3$ is nitro while the other of $X_2$ and $X_3$ is hydrogen, which comprises reacting nitrobenzal chloride of the formula

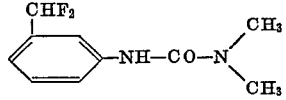

in which $X_1$, $X_2$, and $X_3$ are the same as defined above, with anhydrous hydrogen fluoride at a temperature substantially between about 0–150° C., to form the corresponding nitrobenzal fluoride.

2. Process according to claim 1 wherein $X_1$ and $X_3$ are hydrogen and $X_2$ is nitro.

3. Process according to claim 1 wherein $X_1$ and $X_2$ are hydrogen and $X_3$ is nitro.

4. Process according to claim 1 wherein $X_1$ is chloro, $X_2$ is hydrogen and $X_3$ is nitro.

5. Process according to claim 1 wherein at least 2 mols of hydrogen fluoride are used per mol of said nitrobenzal chloride present.

6. Process according to claim 1 wherein substantially between about 3–8 mols of hydrogen fluoride are used per mol of said nitrobenzal chloride present.

7. Process according to claim 1 wherein said temperature is substantially between about 60–120° C.

8. Process according to claim 1 wherein said reaction is carried out at a pressure of substantially between about 0–25 atmospheres gauge.

9. Process according to claim 1 wherein said reaction is carried out in the presence of an inert organic liquid solvent.

10. Process according to claim 9 wherein said reaction is carried out in the presence of an inert organic liquid solvent selected from the group consisting of aliphatic chlorinated hydrocarbons, aromatic hydrocarbons, and mixtures thereof.

11. Process according to claim 10 wherein said solvent is selected from the group consisting of methylene chloride, chloroform, carbon tetrachloride, benzene, toluene, naphthalene, and mixtures thereof.

12. Process according to claim 1 wherein the formed nitrobenzal fluoride is recovered by fractional distillation.

13. Process according to claim 1 for the production of 3-nitrobenzal fluoride which comprises reacting 3-nitrobenzal chloride with at least 2 mols of anhydrous hydrogen fluoride per mol of 3-nitrobenzal chloride present at about 60–120° C. and 0–25 atmospheres gauge, to form said 3-nitrobenzal fluoride.

14. Process according to claim 1 for the production of 4-nitrobenzal fluoride which comprises reacting 4-nitrobenzal chloride with at least 2 mols of anhydrous hydrogen fluoride per mol of 4-nitrobenzal chloride present, at about 60–120° C. and 0–25 atmospheres gauge, to form said 3-nitrobenzal fluoride.

15. Process according to claim 1 for the production of 2-chloro-5-nitro-benzal fluoride which comprises reacting 2-chloro-5-nitro-benzal chloride with at least 2 mols of anhydrous hydrogen fluoride per mol of 2-chloro-5-nitro-benzal chloride present, at about 60–120° C. and 0–25 atmospheres gauge, to form said 2-chloro-5-nitro-benzal fluoride.

References Cited

UNITED STATES PATENTS 2,702,306    2/1955    Gall et al. _____ 260—646X

OTHER REFERENCES

COON et al., J. Org. Chem., vol. 33, pp. 1387 to 1391 (1968).

LELAND A. SEBASTIAN, Primary Examiner

U.S. Cl. X.R.

71—120; 260—453AR, 553A, 580